(12) United States Patent
Tullock et al.

(10) Patent No.: US 6,384,860 B1
(45) Date of Patent: May 7, 2002

(54) VIDEO TELEMETRY SYSTEM FOR A SATELLITE

(75) Inventors: James E. Tullock, Pacific Palisades; John R. Murphy, El Segundo, both of CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/255,418

(22) Filed: Feb. 22, 1999

(51) Int. Cl.[7] .................................................. H04N 7/18
(52) U.S. Cl. ........................................ 348/144; 348/211
(58) Field of Search ................................ 348/144, 211; H04N 7/18

(56) References Cited

U.S. PATENT DOCUMENTS

| | | | | |
|---|---|---|---|---|
| 4,816,828 A | * | 3/1989 | Feher | ......................... 348/148 |
| 4,831,531 A | * | 5/1989 | Adams et al. | ................. 701/2 |
| 5,654,549 A | * | 8/1997 | Landecker et al. | ......... 348/208 |

* cited by examiner

*Primary Examiner*—Howard Britton
(74) *Attorney, Agent, or Firm*—Terje Gudmestad

(57) ABSTRACT

A video telemetry system for monitoring the deployment of an apparatus coupled to a satellite body includes a camera that produces a video signal. A video compressor is coupled to the camera and digitally compresses the video signal into a digitally compressed video signal. A modulator is coupled to the compressor for modulating the compressed video signal. An antenna is coupled to the modulator for converting the compressed video signal into an RF video signal and transmitting the RF video signal to a ground station or other means for monitoring the signal, particularly during a deployment.

8 Claims, 2 Drawing Sheets

VIDEO TELEMETRY SYSTEM FOR A SATELLITE

TECHNICAL FIELD

The present invention relates to space and communications satellites, and more particularly, to a video monitoring telemetry system for a satellite.

BACKGROUND ART

Satellite technology is becoming more of a mainstream technology. For example, satellites are being used more for cellular phone applications and for television broadcasting. As the desired functions of the satellites increases, the complexity of the satellites also increase.

The complexity and uses of satellites have increased requiring more power consumption. More complex solar panels have been developed in order to generate more power for the satellites. Also the antenna configuration for transmitting and receiving signals have increased in complexity, and the number of antennas located on the spacecraft have also been increased.

When the spacecraft is launched, each apparatus is folded so that it may be placed within a launch vehicle. Due to the increasing complexity of satellites, more complex packaging techniques must be employed.

Commonly, the deployment of each apparatus is monitored from a ground station through the use of various sensors and observing various characteristics. For example, to observe the proper deployment of the solar panels, the power generated may be compared to a value representative of the power that should be generated. One problem with verifying the deployment of a solar panel in this manner is that if the solar panel is of a very complex design, the feedback generated may not be entirely representative of an accurate deployment.

SUMMARY OF THE INVENTION

It is, therefore, one object of the invention to more accurately monitor an apparatus on a spacecraft during deployment.

In one aspect of the invention, a video telemetry system for monitoring the deployment of an apparatus coupled to a satellite body includes a camera that produces a video signal. A video compressor is coupled to the camera and digitally compresses the video signal into a digitally compressed video signal. A modulator is coupled to the compressor for modulating the compressed video signal. An antenna and transmitter are coupled to the modulator for converting the compressed video signal into an RF video signal and transmitting the RF video signal to a ground station or other means for monitoring the signal, particularly during a deployment.

In a further aspect of the invention, a method for observing an apparatus deployment on a satellite comprises the steps of: directing a camera to the apparatus; initiating the deployment of the apparatus; generating a video signal; compressing the video signal into a compressed video signal; modulating the compressed video signal; and converting the compressed video signal into an RF video signal; and transmitting the RF video signal.

One advantage of the invention is that the telemetry transmitter of a satellite may be used to transmit the video signals. By using the telemetry transmitter, the full operation of the switch architecture within the satellite need not be operational. This allows the solar panel, for example, to be observed during deployment. Another advantage of the invention is that the video signal is compressed, thus allowing the signal to be transmitted without being a significant burden on the bandwidth of the telemetry signal. Another advantage of the invention is that much of the commonly existing telemetry circuitry in a satellite may be used.

Other objects and features of the present invention will become apparent when viewed in light of the detailed description of the preferred embodiment when taken in conjunction with the attached drawings and appended claims.

BEST MODE(S) FOR CARRYING OUT THE INVENTION

The present invention is described with respect to the deployment of an apparatus such as an antenna or solar panel from a satellite. One skilled in the art, however, would recognize that the present invention may be applicable to monitoring any apparatus deployed on a satellite during the satellite operation to verify the proper orientation or functionality of the apparatus. The present invention is particularly applicable to the deployment of a solar panel. However, various other components may be monitored such as the various antennas typically located on a satellite.

Figure 1:
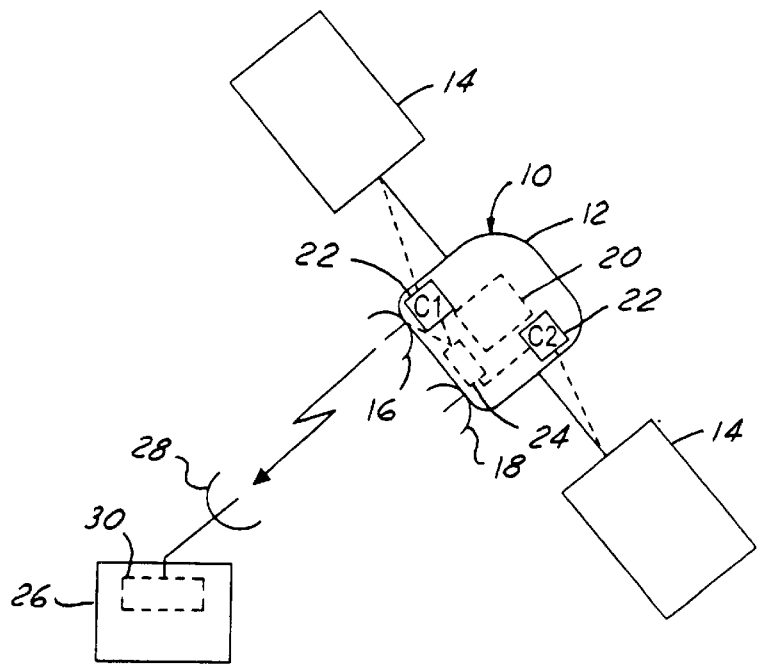
FIG. 1 is a view of a satellite in the deployed configuration in which the present invention is applicable.

Referring now to FIG. 1, a satellite 10 has a satellite body 12. Solar panels 14, a telemetry antenna 16, and a downlink antenna 18 are attached to satellite body 12. Solar panels 14, telemetry antenna 16, and downlink antenna 18 are preferably packaged in a compact manner within the launch vehicle. Satellite 10 is shown after deployment of solar panels 14, telemetry antenna 16, and downlink antenna 18. For simplicity, only solar panels 14, telemetry antenna 16, and downlink antenna 18 are shown; however, other deployable components may be coupled to satellite body 12.

Satellite body 12 contains the electronics for operating the satellite 10. Satellite body 12 may, for example, have switch electronics 20 that are coupled to downlink antenna 18 for transmitting and receiving communication signals. Various types of switch electronics 20 would be evident to those skilled in the art.

Satellite body 12 may also contain two cameras C1 and C2 (both marked 22 in the drawings). Cameras 22 have lenses that are directed to an apparatus to be monitored. Cameras 22 may be located within satellite body 12 to protect them.

Cameras 22 are coupled to video electronics 24. Video electronics 24 are coupled electrically to telemetry antenna 16. As will be further described below, video electronics 24 are used to compress the video signals from camera 22 and transmit an RF signal corresponding to the video signal.

A ground station 26 has an antenna 28 and video receiving circuit 30. As will be further described below, video receiving circuit 30 receives the RF signal from telemetry antenna 16 of satellite 10 and expands the video so that the video signal may be monitored or recorded.

Figure 2:
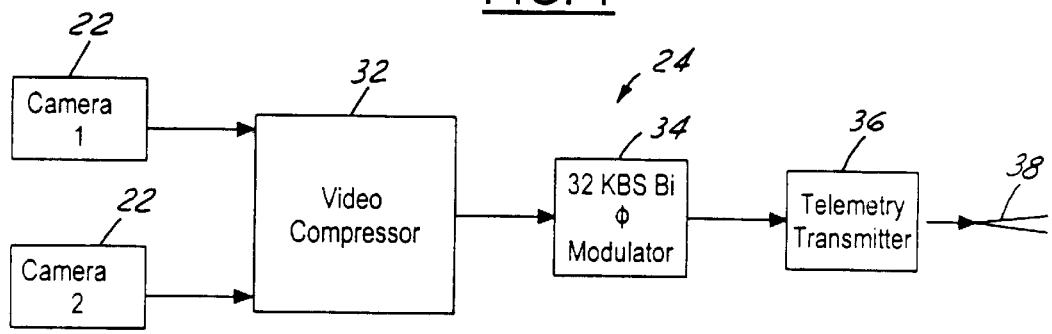
FIG. 2 is a block diagram of a video generating circuit in a satellite.

Referring now to FIG. 2, video circuitry 24 is shown. Cameras 22 are coupled to a video compressor 32. Cameras 22 generate a video signal. Preferably, the video signal is a digital signal. Video compressor 32 digitally reduces the video signal to generate a compressed video signal. Video compressor 32 reduces the amount of bits required to transmit the signal by using a predetermined reduction format. A modulator 34 is coupled to the video compressor 32 and receives the compressed video signal. In a constructed embodiment, video compressor provides the compressed video signal to modulator 34 at four kilobits per second.

Modulator 34 is coupled to a telemetry transmitter 36. Modulator 34 is preferably a bi-phase modulator of the type that is commonly used in the satellite industry. Telemetry transmitter 36 converts the digital signal into an RF signal. At the four kilobits per second downlink rate, one frame of video information may be transmitted about every 27 seconds. Modulator 34 preferably generates a 32 kilohertz subcarrier so that cost of implementation in the ground equipment and satellite may be reduced. Commonly, 32 kilohertz subcarriers may be used for data transmission. Of course, other subcarriers such as 112 Kbs may be used.

An antenna 38 is coupled to transmitter 36 for directing the transmitted data to a ground station from satellite 10.

Figure 3:
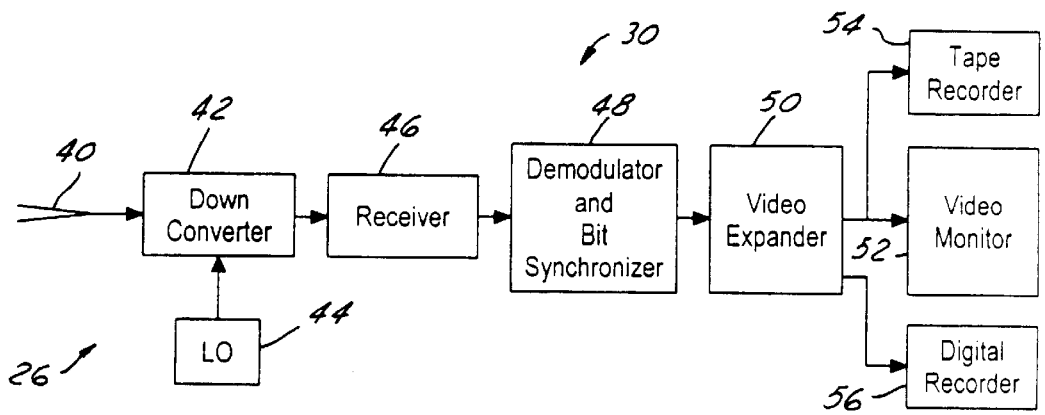
FIG. 3 is a block diagram of a video receiving circuit in a ground station.

Referring now to FIG. 3, video receiving circuitry 30 of ground station 26 is shown in more detail. A receiving antenna 40 is coupled to a down converter 42. Down converter 42 is coupled to a local oscillator 44. Down converter 42 is also coupled to a receiver 46. Down converter 42, local oscillator 44, and receiver 46 act to receive the RF video signal from satellite 10 and convert it into an electrical signal in a conventional manner. Receiver 46 is coupled to a demodulator and bit synchronizer 48. Demodulator and bit synchronizer 48 receives the electrical signals and converts the received electrical signal into a digital signal. The bit synchronizer portion of demodulator and bit synchronizer 48 enables the digital signal to be aligned so that it may be properly expanded.

Demodulator and bit synchronizer 48 are coupled to a video expander 50. Video expander 50 decompresses the video signals and allows the video signal to be monitored. Video expander 50 decompresses the video signal in a conventional manner.

Video expander 50 may be coupled to a video monitor 52, a tape recorder 54, and a digital recorder 56. One or all of video monitor 52, tape recorder 54, or digital recorder 56 may be included in a ground station 26. Video monitor 52 may be a conventional cathode ray tube monitor. Tape recorder 54 may be a conventional video tape recorder such as a VCR. Digital recorder 56 may record the information in purely digital form rather than in analog form as tape recorder 54 would.

Figure 4:
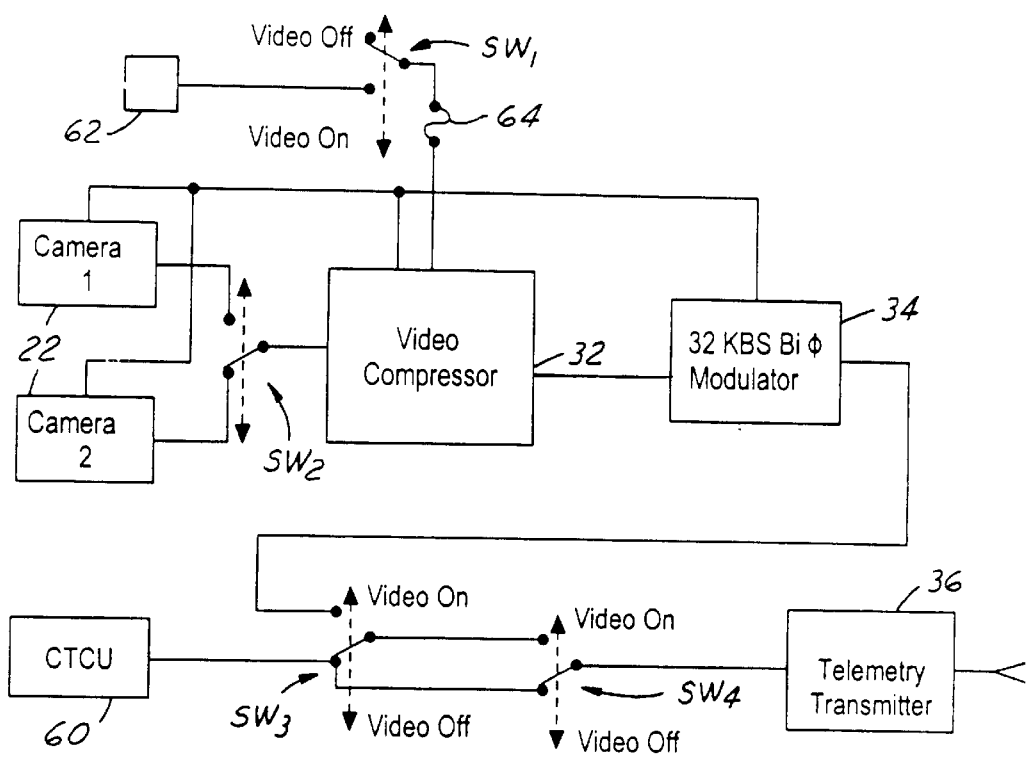
FIG. 4 is a high level schematic view of a video generating circuit implemented on a satellite.

Referring now to FIG. 4, the common elements from FIG. 2 are numbered the same. In FIG. 4, a general schematic of satellite 10 is shown. Satellite 10 has a central command telemetry and control unit (CTCU) 60. When implemented on a spacecraft, video circuitry 24 may include a plurality of redundant switches. A voltage source 62 may be coupled to video compressor 32 through a first switch $SW_1$. This powers the video compressor 32. Simultaneously, switch $SW_2$ chooses the camera from which a video signal is desired. A pair of switches, $SW_3$ and $SW_4$ may be coupled to CTCU 60 between modulator 34 and telemetry transmitter 36. The redundant switches, $SW_3$ and $SW_4$ control the transmitting of the video signal to a ground station.

A fuse 64 may be coupled between switch $SW_1$ and video compressor 32 to prevent overloading of video compressor 32 with power.

Figure 5:
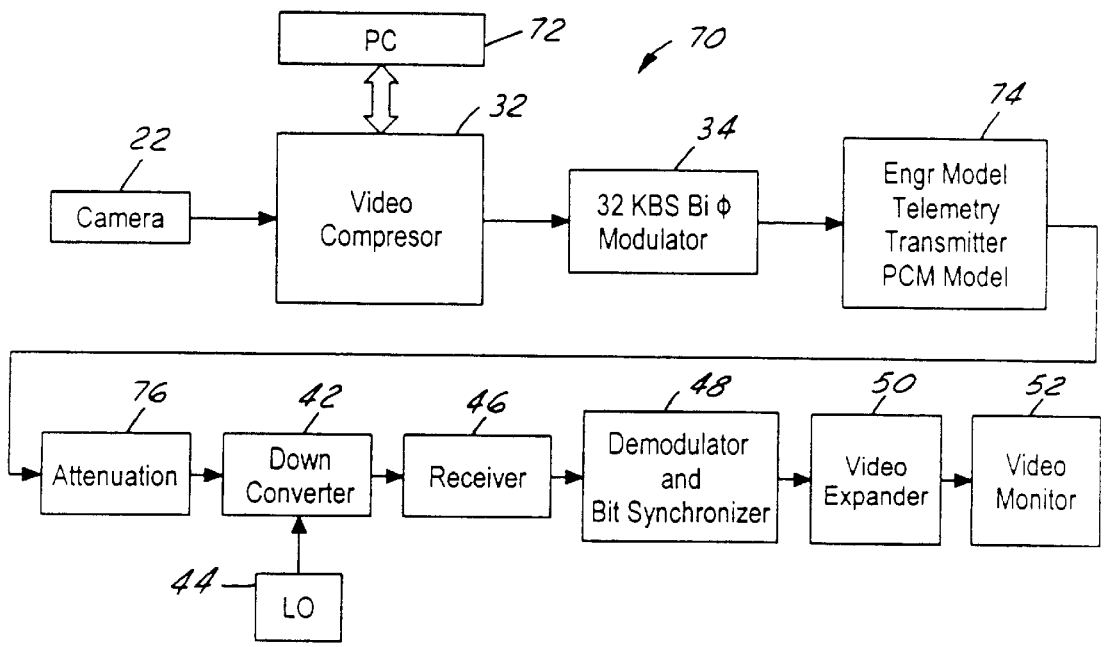
FIG. 5 is a block diagram of a circuit for testing the video generating and receiving capability.

Referring now to FIG. 5, the same reference numerals are used for the same components of FIGS. 2, 3, and 4. A bench test circuit 70 includes may of the same components as that of FIGS. 2 and 3. The bench test tests the operation of video compressor 32, modulator 34, down converter 42, local oscillator 44, receiver 46, demodulator and bit synchronizer 48, video expander 50 and video monitor 52. In addition to those components of FIGS. 2 and 3, a personal computer 72 is coupled to video compressor 32. Personal computer 72 is programmed to control the operation of the test. Because the test is performed on the ground, an engineering model of a transmitter 74 is used rather than an actual transmitter. Engineering model of transmitter 74 is coupled to an attenuator 76. Engineering model of transmitter 74 and attenuator 76 are physically wired together during the test. A successful test of a video circuitry and video receiving circuitry were performed using the bench test circuit 70.

In operation, during the deployment of a satellite, it may be desirable to observe the deployment of a particular apparatus on the satellite. The satellite apparatus is then deployed while a camera is directed toward the apparatus. The camera generates a video signal. The video signal is then compressed into a reduced bit compressed video signal. The compressed video signal is then modulated and converted into an RF video signal. The RF video signal is transmitted to a ground station where it is received and demodulated. After demodulation, the video signal is expanded or decompressed into an actual video signal. The video signal is then recorded on a video recorder or observed using a video monitor. If the cameras on the satellite are redirectable, deployments of various components may be observed.

While particular embodiments of the invention have been shown and described, numerous variations and alternate embodiments will occur to those skilled in the art. Accordingly, it is intended that the invention be limited only in terms of the appended claims.

What is claimed is:

1. A satellite comprising:
   a satellite body;
   an deployable apparatus coupled to the satellite body;
   a camera coupled to said satellite body in view of said deployable apparatus, said camera generating a video signal of said deployable apparatus;
   a video compressor coupled to said camera for compressing said video signal of said deployable apparatus into a compressed video signal;
   a modulator coupled to said compressor for modulating the compressed video signal; and a transmitting antenna coupled to the modulator for converting said compressed video signal into an RF video signal and transmitting said RF video signal.

2. A satellite as recited in claim 1 wherein said transmitting antenna comprises a telemetry antenna.

3. A method for observing an apparatus deployment for a deployable apparatus on a satellite comprising the steps of:

directing a camera to the apparatus;

initiating the deployment of the deployable apparatus;

generating a video signal during deployment of the deployable apparatus;

compressing the video signal into a compressed video signal;

modulating the compressed video signal; and converting the compressed video signal into an RF video signal; and transmitting the RF video signal.

4. A method as recited in claim 3 further comprising the steps of receiving the RF video signal and converting the RF video signal into an electrical signal.

5. A method as recited in claim 4 further comprising the step of demodulating the electrical signal into a demodulated electrical signal.

6. A method as recited in claim 5 further comprising the step of expanding the demodulated electrical signal into a video signal.

7. A method as recited in claim 6 further comprising the step of coupling the video signal to a video monitor.

8. A method as recited in claim 7 further comprising the step of recording the video signal.

* * * * *